US009752888B2

(12) United States Patent
Cho et al.

(10) Patent No.: US 9,752,888 B2
(45) Date of Patent: Sep. 5, 2017

(54) METHOD AND APPARATUS OF COMPUTING LOCATION OF SAFE EXIT FOR MOVING RANGE QUERY IN ROAD NETWORK

(71) Applicant: AJOU UNIVERSITY INDUSTRY-ACADEMIC COOPERATION FOUNDATION, Suwon-si, Gyeonggi-do (KR)

(72) Inventors: Hyung Ju Cho, Yongin-si (KR); Ki Yeol Ryu, Suwon-si (KR); Tae Sun Chung, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 67 days.

(21) Appl. No.: 14/787,187

(22) PCT Filed: Apr. 28, 2014

(86) PCT No.: PCT/KR2014/003704
§ 371 (c)(1),
(2) Date: Oct. 26, 2015

(87) PCT Pub. No.: WO2014/178582
PCT Pub. Date: Nov. 6, 2014

(65) Prior Publication Data
US 2016/0076901 A1 Mar. 17, 2016

(30) Foreign Application Priority Data
Apr. 29, 2013 (KR) .......................... 10-2013-0047441

(51) Int. Cl.
*G01C 21/36* (2006.01)
*G01C 21/26* (2006.01)
*G01C 21/34* (2006.01)

(52) U.S. Cl.
CPC ......... *G01C 21/3605* (2013.01); *G01C 21/26* (2013.01); *G01C 21/3415* (2013.01); *G01C 21/3679* (2013.01)

(58) Field of Classification Search
None
See application file for complete search history.

(56) References Cited

U.S. PATENT DOCUMENTS

| 2011/0113155 A1 | 5/2011 | Kuznetsov et al. ......... 709/241 |
| 2012/0072096 A1 | 3/2012 | Chapman et al. ............ 701/118 |

FOREIGN PATENT DOCUMENTS

| JP | 2011-515753 A | 5/2011 |
| KR | 10-0709274 B1 | 4/2007 |

(Continued)

OTHER PUBLICATIONS

Duncan Yung et al. "A Safe-Exit Approach for Efficient Network-Based Moving Range Queries", Data & Knowledge Engineering 00 (2011) 1-25.

(Continued)

*Primary Examiner* — Mussa A Shaawat
*Assistant Examiner* — Abdhesh Jha
(74) *Attorney, Agent, or Firm* — Stein IP, LLC

(57) ABSTRACT

The present invention relates to a method of computing the result of a moving range query and the locations of safe exits in a road network and, more particularly, to a method and apparatus that receive a range query request from a moving client terminal and that provide a range query result, a safe region in which the range query result is maintained, and the locations of safe exits. The present invention provides a (Continued)

method in which a server provides a first query processing result and information about a safe region that provides a range query result identical to the first query result, thereby minimizing communication between a server and a client terminal when the client terminal is located in the safe region.

13 Claims, 22 Drawing Sheets

(56) References Cited

FOREIGN PATENT DOCUMENTS

KR          10-0863228 B1    10/2008
KR    10-2010-0116421 A1    11/2010

OTHER PUBLICATIONS

Cheema, M.A. et al. "Continuous Monitoring of Distance-Based Range Queries." IEEE Transactions on Knowledge and Data Engineering, Aug. 2011, vol. 23, No. 8, pp. 1182-1199.
International Search Report dated Aug. 21, 2014, issued to International Application No. PCT/KR2014/003704.

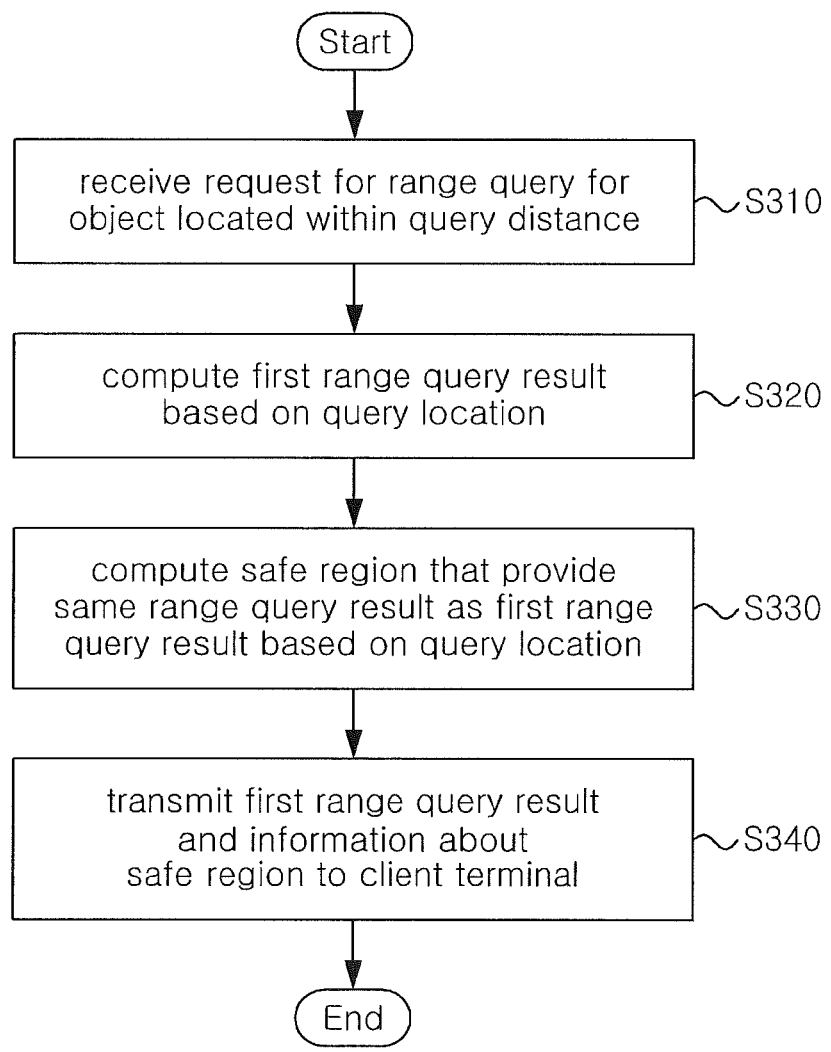

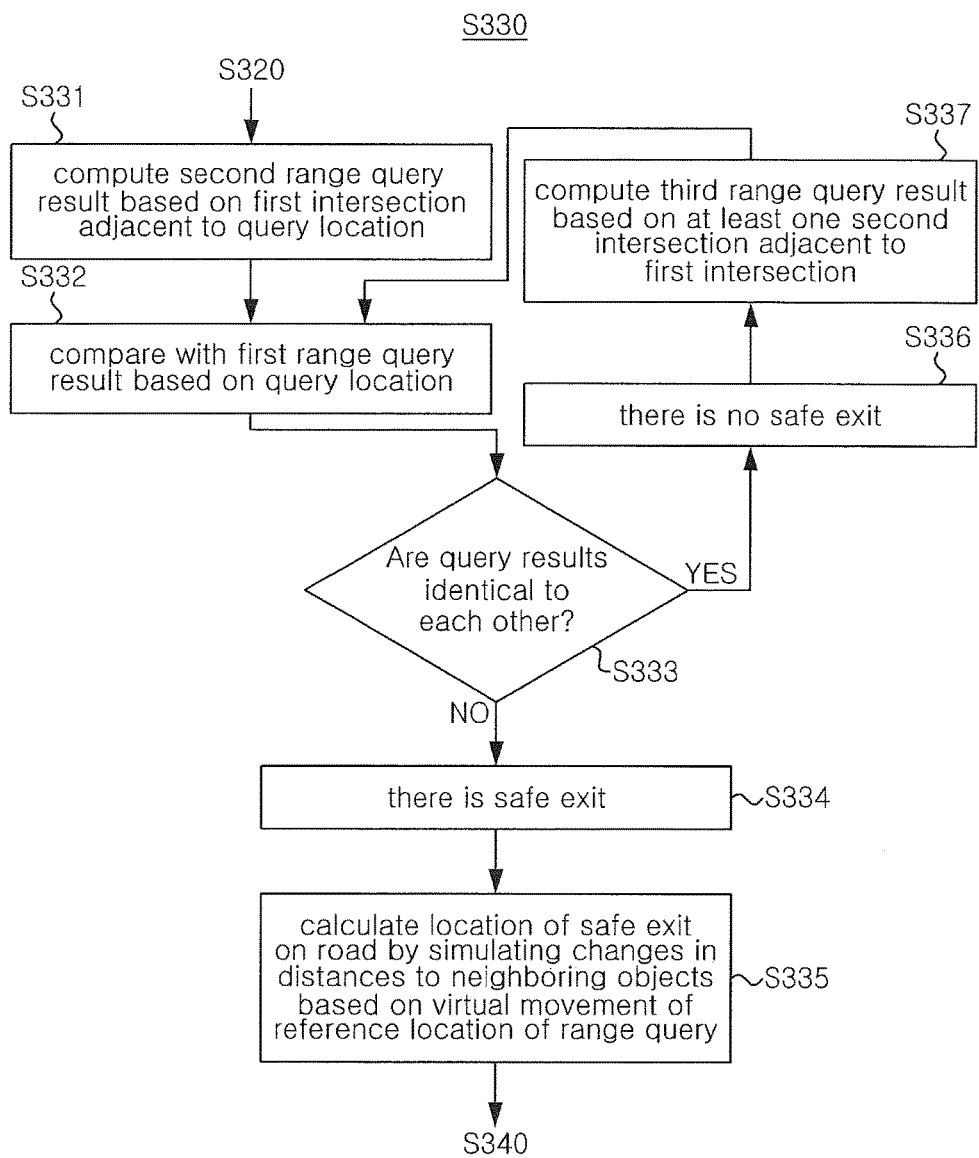

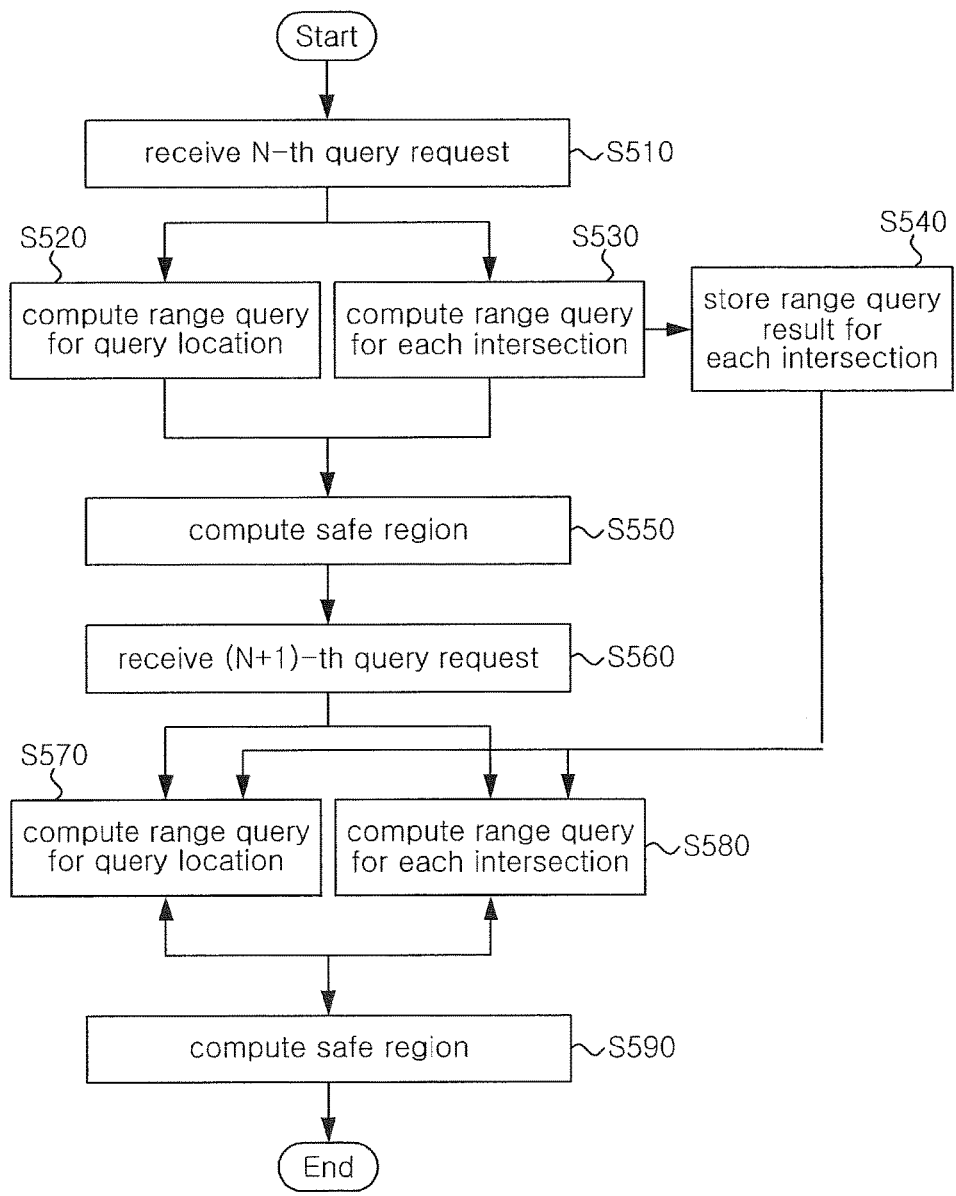

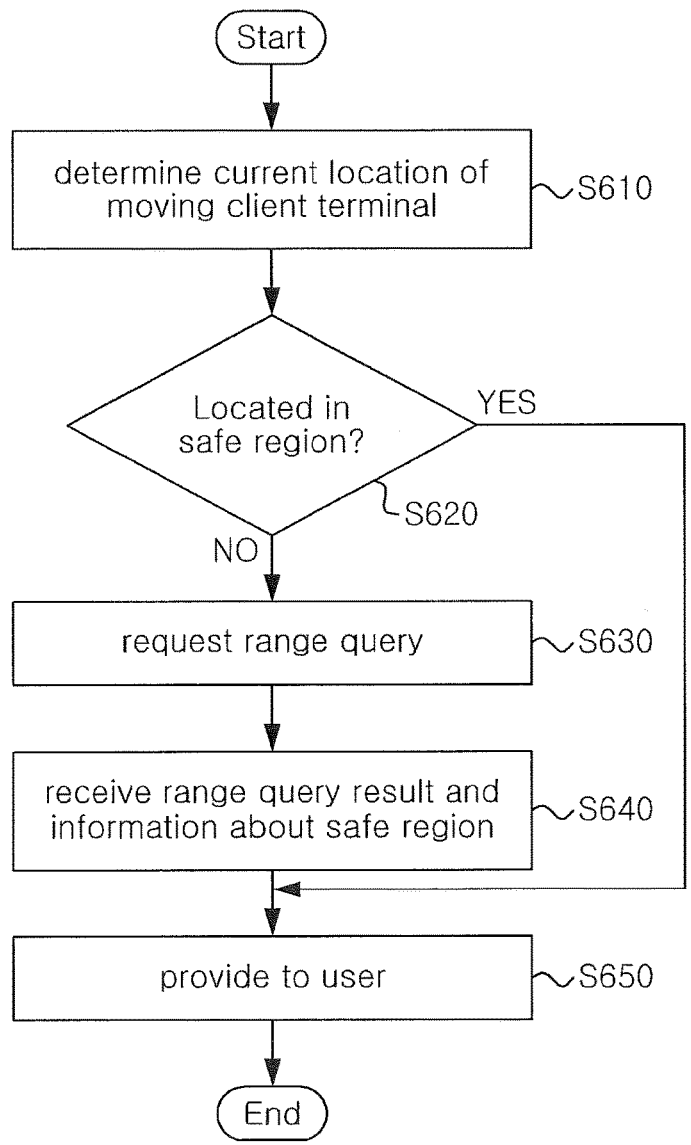

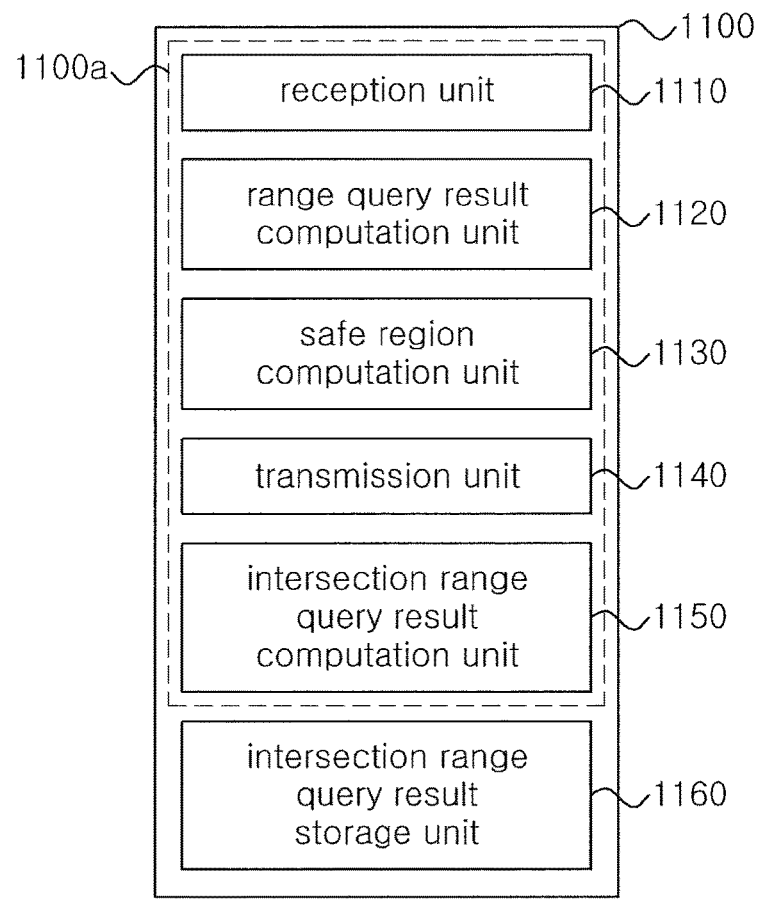

Safe region of q

Critical region of q

Updates to n14n15 and n15n16 at time Tj

METHOD AND APPARATUS OF COMPUTING LOCATION OF SAFE EXIT FOR MOVING RANGE QUERY IN ROAD NETWORK

CROSS-REFERENCE TO RELATED APPLICATIONS

This application is a national stage of International Application No. PCT/KR2014/003704, filed Apr. 28, 2014, claims the benefit of priority to Korean Application No. 10-2013-0047441, filed Apr. 29, 2013, in the Korean Intellectual Property Office, the disclosures of which are incorporated herein by reference.

TECHNICAL FIELD

The present invention relates to a method of computing the result of a moving range query and the locations of safe exits in a road network and, more particularly, to a method and apparatus that receive a range query request from a moving client terminal and that provide a range query result, a safe region in which the range query result is maintained without change, and the locations of safe exits together.

BACKGROUND ART

With the development of mobile communication networks and location search and service technology, such as a GPS, there has recently been a growing interest in an application field that supports location-based service for mobile objects. The location-based service for mobile objects requires k-nearest neighbor queries for efficiently searching for the location information of a mobile object and a static object, such as a gas station.

A database in which the information of road networks, the information of mobile objects, and the information of static objects have been stored is referred to as a road network database. In such a road network database, a road network is modeled by a graph having directionality.

A single road segment corresponds to a main line of a graph, and a point at which two different road segments meet each other corresponds to a node of the graph.

Furthermore, on a road network, facilities, such as a stop, a school and a hotel, are modeled by static objects, and objects having mobility, such as a vehicle and a human, are modeled by mobile objects.

Queries that are used in a road network database include k-nearest neighbor queries, range queries, and spatial join queries.

In the existing Euclidean space, the Euclidean distance (rectilinear distance) between two arbitrary objects can be calculated using only the absolute locations of the objects. However, since a mobile object can move only along a predefined road network in a road network space, the network distance between two objects cannot be calculated using only the absolute locations of the objects. In this case, the network distance between two arbitrary objects refers to the total sum of the lengths of road segments present on the shortest path between the two objects on a road network.

That is, even when absolute locations are the same, the distance varies depending on the status of a network that connects two points. Accordingly, the network distance between two arbitrary points cannot be calculated using only the absolute locations of the two points. Various methods for efficiently obtaining a network distance have been researched. Representative examples thereof include the IER technique, the INE technique, and the VN technique.

An example of a preceding technology related to a network computation method capable of increasing efficiency in the computation of the distance between two objects is disclosed in Koran Patent No. 10-0709274 entitled "Integrated Indexing Structure for Road Network-based Mobile Objects." This preceding technology shares a part for storing and managing a network structure, i.e., a common part between the current location and past location indexes of each road network-based mobile object, and supports not only the current location of a mobile object but also the past locations of the mobile object by using an indexing structure in which the index of a current location, the indexes of past locations and the function of generating and processing a close past location generated by the update of a current location have been integrated with one another. Accordingly, this preceding technology can overcome the problem of a conventional mobile object indexing structure in which a separate calculation process is required for a search for the current and past locations of a mobile object. Furthermore, this preceding technology integrates a common part between a current location index and past location indexes. Therefore, this preceding technology was devised for the purpose of reducing the costs required for the storage space and update of indexes compared to a case where indexes are separately maintained.

However, according to this preceding technology, problems arise in that communication costs increase because a server and a client terminal periodically communicate with each other in the process of calculating the shortest distance and in that the computational costs of the server significantly increase because the server searches for and provides objects suitable for the requirements of clients when the number of clients increases.

Accordingly, in a range query, a region that provides a result identical to a query result at a query location is referred to as a "safe region," and a boundary point of a safe region, i.e., an exit of a safe region, is referred to as a "safe exit" A preceding technology for searching for both a query result and a safe exit in a range query was proposed in the paper by D. Yung, M. Yiu, and E. Lo, entitled "A safe-exit approach for efficient network-based moving range queries," Data Knowl. Eng. Vol. 72, pp. 126-147, 2012.

This preceding technology presents a method for searching for both a query result and a safe exit in a range query. This preceding technology deals with a range query for a static object from a moving querier, and finds a query result by inspecting all object candidates located within a 3r range that is three times the query distance r of a range query.

Although this preceding technology can present a safe exit in response to a moving range query, a computational load is massive because all the objects located within the 3r range are inspected, and also this preceding technology does not take into account a case where the directionality of a road network is present. Since this preceding technology incurs a computational load, a computational load becomes more massive when a road network having one-way directionality is considered, with the result that this preceding technology is not suitable for this case.

Therefore, there is a need for a method of computing a moving range query and a safe exit, which can be practically implemented, i.e., which can reduce a computational load and can also take into account a road network having one-way directionality.

SUMMARY OF THE DISCLOSURE

Accordingly, the present invention has been made to solve the above problems occurring in the prior art, and an object of the present invention is to, in response to a moving range query from a moving client terminal (a querier), search for a safe region that provides a result identical to a range query result based on a query location and transfer information about the safe region, together with the range query result, to the terminal.

An object of the present invention is to present a technique for effectively computing information about a safe region for a range query for a road network having directionality. Such information about a safe region provides the advantages of reducing the exchange of data between a server and a client terminal in connection with a moving range query and also reducing the computational load of the server.

Furthermore, an object of the present invention is to present a technique for recognizing boundary points of a safe region as safe exits, determining the presence of each safe exit through comparison with a range query result based on an intersection in the computation of the safe exit and calculating the locations of the safe exits taking account of query distances to objects based on changes in the location of a terminal.

Furthermore, an object of the present invention is to present a technique for, from the standpoint of a client terminal, providing a range query result based on the current location of the client terminal to a user using a range query result and information about a safe exit received from a server and re-requesting a range query for a second location other than the current location to the server if the client terminal has passed through a safe exit or is expected to pass through a safe exit soon.

Accordingly, the present invention presents a scheme in which a server provides not only a query processing but also information about a safe region that provides a query result identical to the former range query result, thereby minimizing communication between the server and a client terminal before the client terminal passes through a safe exit. Using this scheme, the present invention is intended to reduce the computational costs of the server and also reduce the costs required for communication between the client and the server.

Furthermore, an object of the present invention is to provide a shared execution technique for sharing a range query result at an intersection node, which can be shared by each range query, in order to reduce the computational load of a server. According to this technique, once a range query result has been computed at a specific intersection node, this range query results can be shared by a subsequent range query, and thus the computational load of the server required for the computation of each range query can be significantly reduced.

In accordance with an aspect of the present invention, there is provided an apparatus for computing a range query result, including a processor comprises: a reception unit configured to receive a request for a range query for an object located within a query distance from a query location, from a client terminal; a range query result computation unit configured to compute a first range query result based on the query location in response to the request for the range query; a safe region computation unit configured to compute a safe region that provides a range query result identical to the first range query result based on the query location; and a transmission unit configured to transmit the first range query result based on the query location and information about the safe region to the mobile terminal.

In this case, the range query result computation unit may calculate a distance from the query location to the object by taking account of the direction information associated to a road segment located within the query distance from the query location, and may then compute the range query result.

In accordance with another aspect of the present invention, there is provided an apparatus for providing a range query result, including a processor comprises: a query request unit configured to request a range query for an object, located within a query distance from a first location, to a server; a reception unit configured to receive a first range query result based on the first location and information about a safe region that provides a result identical to the first range query result based on the first location; and a current location determination unit configured to determine the current location of a moving client terminal. Further, the apparatus for providing a range query result may include a query result provision interface configured to, if the current location of the moving client terminal is included in the safe region, provide the range query result based on the first location to a user as a range query result for the current location under the control of the processor.

In this case, the query request unit may request a second range query for a second location to the server if the current location is not included in the safe region or the current location is expected to depart from the safe region soon.

In accordance with still another aspect of the present invention, there is provided a method of computing a range query result, including: receiving a request for a range query for an object located within a query distance from a query location, from a client terminal; computing a first range query result based on the query location in response to the request for the range query; computing a safe region that provides a range query result identical to the first range query result based on the query location; and transmitting the first range query result based on the query location and information about the safe region to the terminal.

In this case, the first range query result may depend on the direction information of a road segment located within the query distance from the query location.

In accordance with still another aspect of the present invention, there is provided a method of providing a range query result, including: requesting a range query for an object located within a query distance from a first location, to a server; receiving a first range query result based on the first location and information about a safe region that provides a result identical to the first range query result based on the first location; determining the current location of a moving client terminal; and, if the current location of the moving client terminal is included in the safe region, providing the first range query result based on the first location to a user as a range query result for the current location.

In this case, the first range query result may depend on direction information of a road segment located within the query distance from the first location.

BRIEF DESCRIPTION OF THE DRAWINGS

The above and other objects, features and advantages of the present invention will be more clearly understood from the following detailed description taken in conjunction with the accompanying drawings, in which:

FIG. 3 is an operation flowchart showing a method of providing range query results in a server according to an embodiment of the present invention;

FIG. 4 is an operation flowchart showing an embodiment of the step of computing a safe region that provides a range query result identical to a range query result based on a query location q, a step of FIG. 3, in more detail;

FIG. 5 is an operation flowchart showing a method of computing a range query result based on the sharing of a range query result at an intersection according to an embodiment of the present invention;

FIG. 6 is an operation flowchart showing a method of providing a range query result in a terminal according to another embodiment of the present invention;

FIG. 11 is a block diagram showing an apparatus for computing a range query result, which is included in a server, according to an embodiment of the present invention;

DETAILED DESCRIPTION OF THE DISCLOSURE

Embodiments of the present invention will be described in detail with reference to the accompanying drawings. In the following description of the present invention, detailed descriptions of related well-known components or functions that may unnecessarily make the gist of the present invention obscure will be omitted.

The prevent invention is not limited to the embodiments. Throughout the accompanying drawings, the same reference symbols are assigned to the same components.

Figure 1:
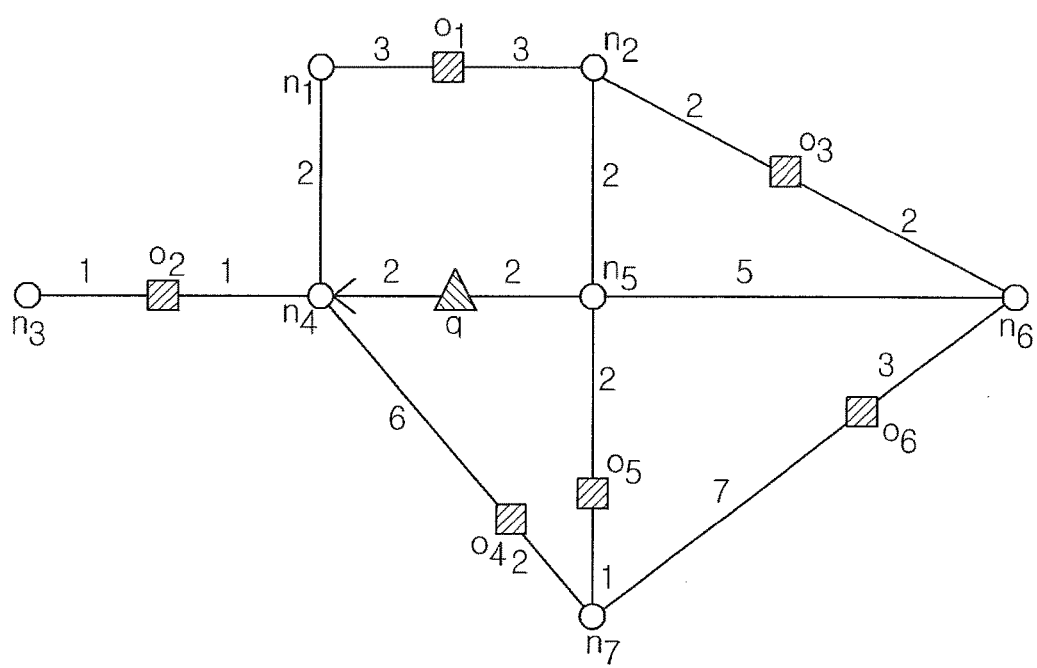
FIG. 1 is a diagram showing the overall configuration of a road network including a client terminal and objects according to an embodiment of the present invention.

FIG. 1 is a diagram showing the overall configuration of a road network including a client terminal and objects according to an embodiment of the present invention.

In FIG. 1, q denotes the query location of the client terminal, and $O_1$ to $O_6$ denote Point of interests (POIs). In this case, POIs denote objects representative of a restaurant, a gas station, a school and the like. Furthermore, a number on a graph designates the distance between two points, and each of nodes $n_1$ to $n_7$ designates an intersection or boundary point of each road segment. In this case, a number on a graph may designate the distance between two points, and may designate the arrival time between two points, to which a weight has been assigned taking account of the traffic conditions of a road in a road network.

Furthermore, referring to FIG. 1, the distance between two nodes or objects is indicated on a road network. For example, the distance between the node $n_1$ and an adjacent object $O_1$ is represented by 3, and the distance between the node $n_1$ and the node $n_4$ is represented by 2.

Meanwhile, directionality, or direction information is present for the road segment between the nodes $n_4$ and $n_5$. That is, it is indicated that one-way traffic is allowed for the road segment from the node $n_5$ to the node $n_4$. In this case, the distance from the node $n_5$ to the node $n_4$ is 4, which is calculated by considering the directionality of the road segment from the node $n_4$ to the node $n_5$. For example, 10, i.e., the path distance up to the node $n_5$ through the segment between the nodes $n_1$ and $n_2$, i.e., the shortest distance, may be calculated using the distance from the node $n_4$ to the node $n_5$.

Meanwhile, in the embodiment of FIG. 1, an object closest to the query location q may be calculated as $O_2$. The reason for this is that, when the directionality of a road segment is taken into account at the query location q, the distance between the query location q and the object $O_1$ is calculated as 7, the distance between the query location q and the object $O_2$ is calculated as 3, the distance between the query location q and the object $O_3$ is calculated as 12, the distance between the query location q and the object $O_4$ is calculated as 8, the distance between the query location q and the object $O_5$ is calculated as 11, and the distance between the query location q and the object $O_6$ is calculated as 17, with the result that an object closest to the query location q is determined to be $O_2$.

Figure 2:
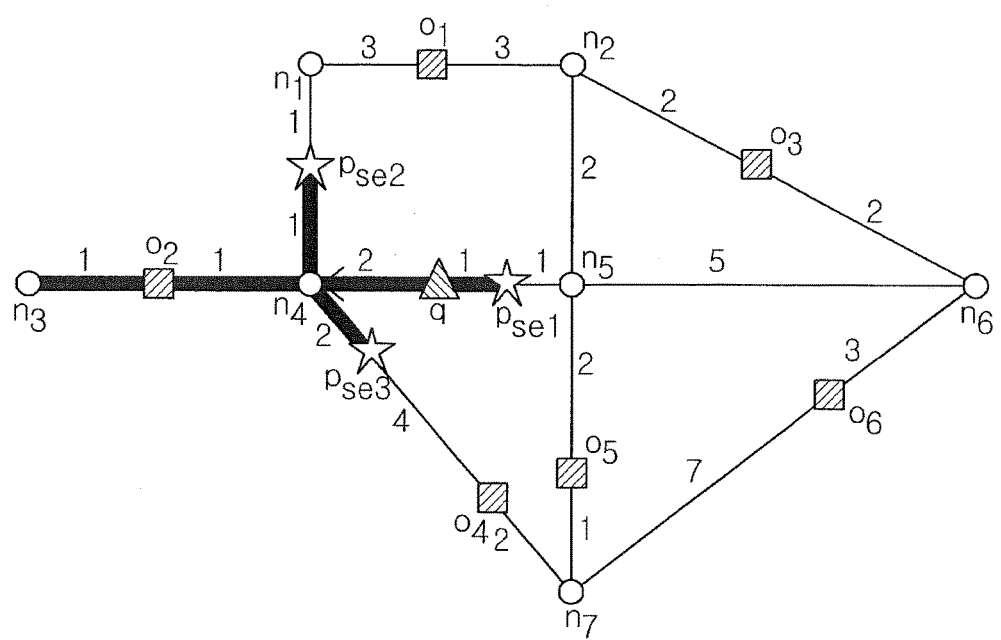
FIG. 2 is a diagram showing the overall configuration of the road network in which a safe region and safe exits have been indicated on the road network of FIG. 1.

FIG. 2 is a diagram showing the overall configuration of the road network including a safe region and safe exits in the road network of FIG. 1.

A server may generate the query result of a range query for an adjacent object located within a query distance r from a query location q and information about a safe region by considering the directionality of the road segment.

Referring to FIG. 2, the safe region shown in FIG. 2 is indicated by thick segments, and safe exits $P_{se1}$, $P_{se2}$ and $P_{se3}$ are indicated by asterisks.

A safe region SR at the query location q shown in FIG. 2 is expressed by following equation:

$$SR = \{\overline{n_3 n_4}, \overline{P_{se2} n_4}, \overline{n_4 P_{se3}}, \overline{n_4 P_{se1}}\}$$

In this case, the safe region is a region in which a query result at the query location q is maintained. Furthermore, a safe exit is a boundary point between a safe region in which the current query result at the query location q is maintained and a non-safe region in which the current query result is not maintained. When information about the arrangement of a road network and locations is shared between the server and the terminals, the server transfers all information about the safe region by providing notification of the locations of all the safe exits regarding the safe region to the terminal. In this case, a set of safe exits $P_{SE}$ may be presented by $P_{SE}=\{P_{se1}, P_{se2}, P_{se3}\}$.

The query result of a range query for an object located within the query distance r from the query location q may be represented by $\{O(q, r)\}$. In this case, when the query location q is located between an intersection $n_s$ and an intersection $n_e$, the query result $\{O(q, r)\}$ may be obtained among objects located among $\{O(n_s, r)\}$, $\{O(n_e, r)\}$, the intersection $n_s$, and the intersection $n_e$.

In the case where this relationship is extended, when the query location q is located on a path $\overline{n_s n_{S+1}...n_e}$, the query result $\{O(q, r)\}$ may be included in a set $O(\overline{n_s n_{S+1}...n_e})$ given by Equation 1 below:

$$O(\overline{n_s n_{S+1}...n_e}, r) = O(n_s, r) \cup O(n_e, r) \cup O(\overline{n_s n_{S+1}...n}) \quad (1)$$

In this case, $O(\overline{n_s n_{S+1}...n_e}, r)$ is the union of range query results at respective points on the path $\overline{n_s n_{S+1}...n_e}$ (in this case, the query distance is r). To obtain the query result $\{O(q, r)\}$ and the safe region, a search range may be set to $O(\overline{n_s n_{S+1}...n_e}, r)$ first. Equation 1 above may be viewed as representing the search range of the present invention, which will be described in conjunction with FIGS. 7A through 10B later.

According to the definition of the safe region, a range query result at an arbitrary point within the safe region SR={$\overline{n_3 n_4}$, $\overline{P_{se2} n_4}$, $\overline{n_4 P_{se3}}$, $\overline{n_4 P_{se1}}$} and the current query result at the query location q are as follows:

While the client terminal is moving from the query location q and before the client terminal passes through a safe exit, a query result identical to the current query result received from server is maintained.

Thereafter, when the current location of the terminal is not included within the safe region or the current location is expected to depart from the safe region soon, the client terminal may request a range query result for a second location of the server.

In this case, although the query location q is considered to be the current location of the moving client terminal for ease of description, the query location q does not necessarily need to be the current location of the client terminal. The query location q is a location that is a reference for a range query. Accordingly, the user of the terminal may sets the reference location for a range query to an arbitrary location other than his or her own current location, and may select the set location as the query location q.

FIG. 3 is an operation flowchart showing a method of providing range query results in a server according to an embodiment of the present invention.

Referring to FIG. 3, a server according to the present embodiment receives a request for a range query for an object located within a query distance r from a query location q from a client terminal at step S310.

The server computes a first range query result based on the query location q in response to the request for the range query for an object located within the query distance r from the query location q at step S320.

In this case, the server may take into account the directionality, or direction information associated to a road segment during the computation of the range query result. The directionality of a road segment may be represented by whether two-way traffic is allowed or not. For each road segment, two-way traffic may be allowed, or only one-way traffic may be allowed. In the case of one-way traffic, information about the direction of a road segment in which one-way traffic may be allowed is additionally given.

Furthermore, the directionality of a road segment is given to a connection path between road segments, as in the case where a left turn is prohibited or only a left turn is allowed. That is, an example of this is a case where traffic is allowed only in a specific direction at an intersection.

In this case, the server may take into account the directionality of a road segment located within the query distance r based on the query location q. When directionality is given to a road segment, influence on the path distance may be wide. Accordingly, in an embodiment, not only the directionality of a road segment located within the query distance r from the query location q but also the directionality of a road segment located outside the query distance r may need to be taken into account. The server computes a safe region that provides a range query result identical to the first range query result based on the query location q at step S330.

The server transmits information about the safe region that provides a range query result identical to the first range query result based on the query location q, together with the first range query result based on the query location q, to the client terminal at step S340.

Although the information about the safe region may be given in various manners, all the boundary points of the safe region, that is, information about the locations of all safe exits, may cover the information about the safe region in the present embodiment. Accordingly, a safe region may be determined using only information about the locations of safe exits without a need for an excessive amount of information about the safe region.

FIG. 4 is an operation flowchart showing an embodiment of the step of computing a safe region that provides a range query result identical to a first range query result based on a query location q, a step of FIG. 3, in more detail.

The server computes a second range query result based on a first intersection adjacent to a query location at step S331.

The server compares the first range query result based on the query location q and the second range query result based on the first intersection at step S332, and then determines whether the first range query result based on the query location q of the client terminal is identical to the second range query result based on the first intersection at step S333.

If the first range query result based on the query location q is not identical to the second range query result based on the first intersection, the server determines that a safe exit is present between the query location q and the first intersection at step S334, and calculates the location of the safe exit on a road by simulating changes in the distances to adjacent objects caused by the virtual movement of the reference location of the range query on a road segment on which the safe exit has been determined to be present at step S335. Step S335 will be described in conjunction with FIG. 7A below.

If the first range query result based on the query location q is identical to the second range query result based on the first intersection, the server determines that a safe exit is not present between the query location and the first intersection at step S336, and computes a third range query result based on at least one second intersection adjacent to the first intersection at step S337. The server compares the third range query result based on the second intersection and the first range query result based on the query location q at step S332.

In this case, at step S331, the server may compute second range query results based on one or more first intersections adjacent to the query location q. The server may perform step S332 on the one or more first intersections. The server may perform steps S334 and S335 on each first intersection exhibiting a second range query result different from the first range query result based on the query location q. The server sets a second intersection for each first intersection exhibiting a second range query result identical to the first range query result based on the query location q. In this case, a node that is adjacent to the first intersection but is identical to the first intersection discussed at step S331 is excluded at step S337.

Results in which in the embodiment of FIG. 2, a start node $p_{anchor}$ and a destination node $n_b$ are defined for each road segment and whether a safe exit is present has been determined for each path are listed in Table 1 below:

The server computes range query results at the start node and destination node of each road segment, and compares the range query results, thereby determining whether the range query results are identical to each other. In the road segment to which the query location q belongs, the road segment is segmented based on the query location q, and range query results for the resulting road segments are compared with each other.

TABLE 1

| Segment | $p_{anchor}$ | $n_b$ | $O(p_{anchor}, r)$ | $O(n_b, r)$ | O(segment) | Safe exit point |
|---|---|---|---|---|---|---|
| $\overleftarrow{n_4 q}$ | q | $n_4$ | $O(q, r) = \{o_2\}$ | $O(n_4, r) = \{o_2\}$ | $O(\overleftarrow{n_4 q}) = \phi$ | none |
| $\overleftarrow{q n_5}$ | q | $n_5$ | $O(q, r) = \{o_2\}$ | $O(n_5, r) = \{o_3, o_5\}$ | $O(\overleftarrow{q n_5}) = \phi$ | $P_{se1}$ |
| $\overleftarrow{n_3 n_4}$ | $n_4$ | $n_3$ | $O(n_4, r) = \{o_2\}$ | $O(n_3, r) = \{o_2\}$ | $O(\overleftarrow{n_3 n_4}) = \{O_2\}$ | none |
| $\overleftarrow{n_2 n_1 n_4}$ | $n_4$ | $n_2$ | $O(n_4, r) = \{o_2\}$ | $O(n_2, r) = \{o_1, o_3, o_5\}$ | $O(\overleftarrow{n_2 n_1 n_4}) = \{O_1\}$ | $P_{se2}$ |
| $\overleftarrow{n_4 n_7}$ | $n_4$ | $n_7$ | $O(n_4, r) = \{o_2\}$ | $O(n_7, r) = \{o_4, o_5\}$ | $O(\overleftarrow{n_4 n_7}) = \{O_4\}$ | $P_{se3}$ |

The server may find $P_{se1}$, $P_{se2}$ and $P_{se3}$ as safe exits, as listed in Table 1. In this case, since a safe exit is not present between the node $n_4$ and the query location q, the server extends a search range to nodes $n_3$, $n_2$, $n_1$ and $n_7$ adjacent to the node $n_4$, and compares range query results. A safe exit is not present between the node $n_3$ and the node $n_4$, but the road network shown in FIG. 2 does not include a road network after the node $n_3$. Accordingly, a description of results obtained by extending the search range to nodes adjacent to the node $n_3$ is omitted herein.

FIG. 5 is an operation flowchart showing a method of computing a range query result based on the sharing of a range query result at an intersection according to an embodiment of the present invention.

The server receives an N-th range query request from a client terminal at step S510. The server computes a range query result for a query location at step S520. In this case, the server may compute range query results for one or more intersections at step S520 in parallel with step S530. The server stores the range query results for the intersections at step S540.

The server computes a safe region that provides a range query result identical to the range query result for the query location at step S550. The server may provide information about the safe region (safe exits), together with the range query result for the query location, to the client terminal.

The server receives an (N+1)-th range query request from the client terminal at step S560, and computes a range query result for a query location at step S570. In this case, server may perform step S580 of computing range query results for one or more intersections in parallel. In this case, steps S570 and S580 may be performed using the range query results for the one or more intersections stored at step S540.

Since the method of computing a range query result according to the present invention refers to a range query result at an intersection (a node) adjacent to a query location when computing a range query at the query location, this range query result sharing technique can be employed. For example, it is assumed that in response to an N-th range query, range query results at M adjacent nodes are computed and information about a safe region is acquired. In an (N+1)-th range query, there is strong possibility that at least part of the previous M adjacent nodes is still located within the query distance r from a new query location. In this case, in the (N+1)-th range query, at least part of the range query results of the previous M adjacent nodes may be shared and used, and the computational load of the (N+1)-th range query may be reduced due to the shared part.

The server computes a safe region that provides a range query result identical to the range query result for the (N+1)-th query location of the client terminal at step S590.

FIG. 6 is an operation flowchart showing a method of providing a range query result in a terminal according to another embodiment of the present invention.

The moving client terminal determines a current location at step S610. The client terminal determines whether the current location is located within a safe region at step S620, and may request a range query to the server if the current location of the client terminal is not included in the safe region or the current location is expected to depart from the safe region soon at step S630.

In this case, the client terminal may determine whether a current location has departed from the safe region based on the safe exit information received along with the range query result that the client terminal previously requested in connection with the first location.

If the current location of the client terminal has already departed from the safe region, a range query based on the current location (second location) of the client terminal is requested to the server at step S630. In this case, although not shown in FIG. 6, when the current location of the client terminal has not departed from the safe region and is expected to depart from the safe region soon based on the direction of the movement of the client terminal, the client terminal may set a location beyond a safe exit as a new query location, and may request a range query for a new query location to the server. In this case, the new query location becomes a reference for the range query as a second location.

The client terminal receives a range query result based on the current location (second location) of the client terminal and information about a safe region that provides a result identical to the range query result based on the current location (second location) of the client terminal at step S640, and provides the range query result based on the second location to a user as the range query result for the current location of the client terminal at step S650.

In this case, if the current location of the client terminal is located within the safe region, the client terminal provides the previously received range query result based on the first location to the user as the range query result for the current location of the client terminal at step S650.

In this case, a method of providing the range query result to the user may include methods using various interfaces based on a display, a speaker, vibration and the like.

Furthermore, if the current location of the client terminal is not included in the safe region of the range query based on the second location or the current location is expected to depart from the safe region soon, the client terminal may request a range query for a third location to the server.

Figure 7A:
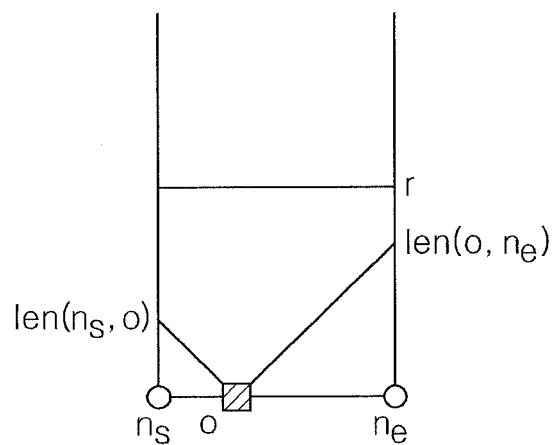
FIGS. 7A, 7B, and 7C are diagrams showing the number of various cases of computing the distance to an object based on the movement of a virtual reference location between two intersections according to an embodiment of the present invention.
Figure 7B:
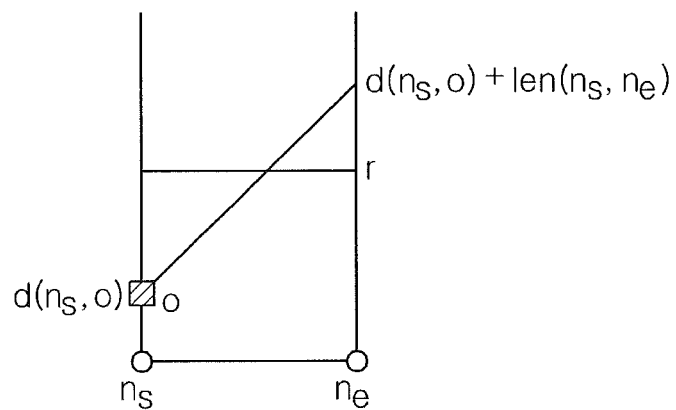
Figure 7C:
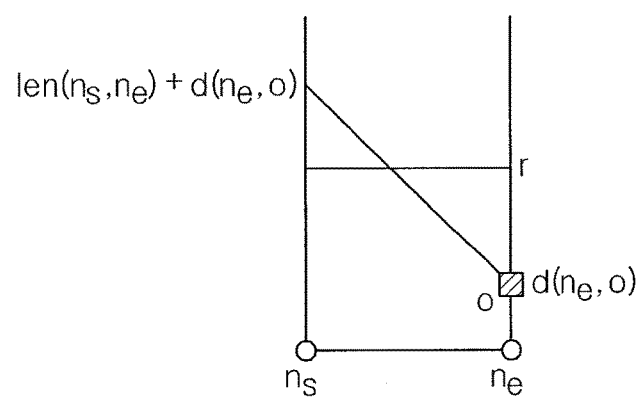

FIGS. 7A, 7B, and 7C are diagrams showing the number of various cases of computing the distance to an object based on the movement of a virtual reference location between two intersections according to an embodiment of the present invention. It is assumed that the virtual reference location moves from $n_s$ to $n_e$ between two intersections shown in FIGS. 7A through 7C.

FIGS. 7A through 7C show embodiments of location relationships that an object O may have in connection with a corresponding road segment.

FIG. 7A shows a case where an object O is present between two intersections. When a virtual reference location is a node $n_s$, the distance from the virtual reference location to the object O may be represented by len($n_s$, O). When the virtual reference location moves in the direction from the node $n_s$ from the object O, the distance from the virtual reference location to the object O gradually decreases. When the virtual reference location passes through the object O and moves in the direction to the node $n_e$, the distance from the virtual reference location to the object O gradually increases.

In this case, assuming that the query distance is "r," the object O continues to be located within the distance r on a path from th node $n_s$ to the node $n_e$, and thus it can be seen that the object O is not an object that influences the computation of a safe region in a current road segment.

FIG. 7B shows a case where an object O is located beyond a node $n_s$. When a virtual reference location is a node $n_s$, the distance from the virtual reference location to the object O may be represented by d($n_s$, O). As the virtual reference location moves from the node $n_s$ to a node $n_e$, the distance from the virtual reference location to the object O linearly increases. Accordingly, in this case, the distance from the node $n_e$ to the object O becomes d($n_s$, O)+len($n_s$, $n_e$).

In this case, as the virtual reference location moves, the distance between the virtual reference location to the object O comes to exceed the query distance r, and thus the object O influences the computation of a safe region in the road segment of FIG. 7B. The location at which the distance to object O is equal to r becomes a safe exit.

FIG. 7C shows a case where an object O is located beyond a node $n_e$. When a virtual reference location is a node $n_e$, the distance from the virtual reference location to the object O is represented by d($n_e$, O). As the virtual reference location moves from a node $n_s$ to the node $n_e$, the distance from the virtual reference location to the object O linearly decreases. When an inverse operation is performed on the linear reduction, the distance from the node $n_s$ to the object O is len(ns, $n_e$)+d(ne, O).

In this case, as the virtual reference location moves, the distance between the virtual reference location to the object O decreases within the query distance r, and the object O influences the computation of a safe region on the road segment of FIG. 7C. The location at which the distance to the object O is equal to r becomes a safe exit.

Figure 8A:
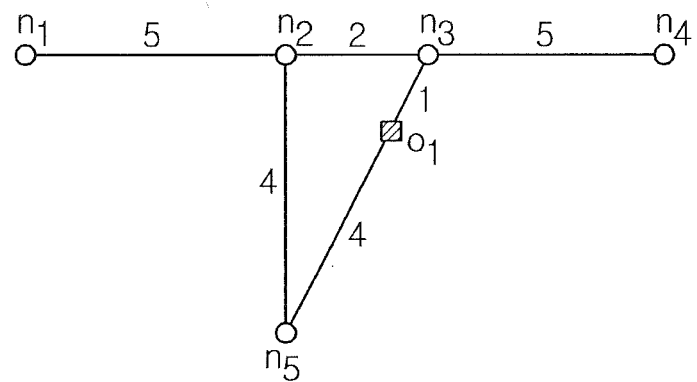
FIGS. 8A, 8B, and 8C are diagrams showing the number of various cases of computing the distance to an object based on the movement of a virtual reference location among three intersections according to an embodiment of the present invention.
Figure 8B:
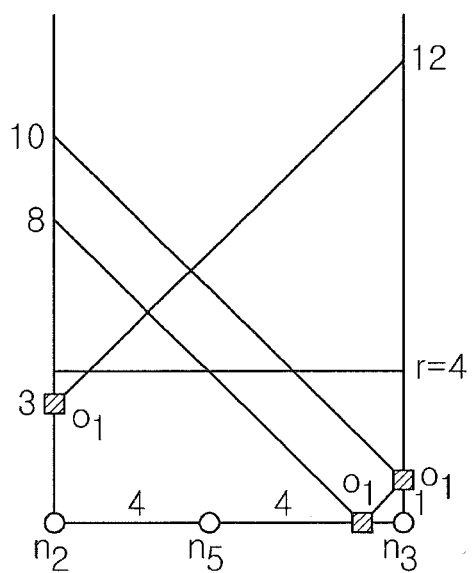
Figure 8C:
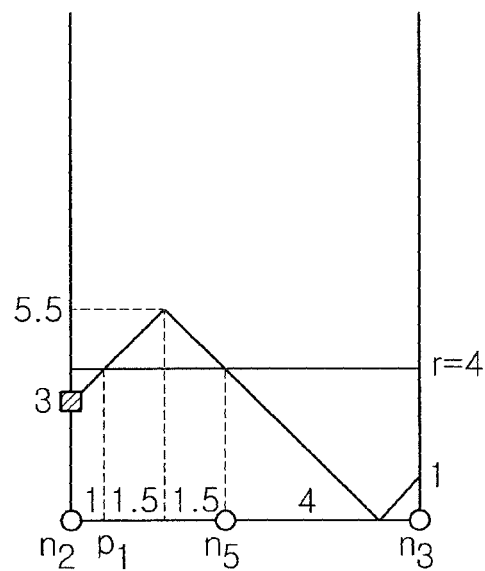

FIGS. 8A, 8B, and 8C are diagrams showing the number of various cases of computing the distance to an object based on the movement of a virtual reference location among three intersections according to an embodiment of the present invention. FIG. 8A shows a road network on which the value of a safe region or range query is influenced by an object $O_1$.

It is assumed that a virtual reference location moves in the sequence of $n_2$, $n_5$, and $n_3$ in the road network of FIG. 8A.

FIG. 8B shows cases where distance models based on the various location relationships of FIGS. 7A through 7C have been applied to the road network of FIG. 8A. When the model of FIG. 7A is applied, the distance from the virtual reference location to the object $O_1$ decreases between a node $n_5$ to $n_3$, becomes 0 at the location of the object $O_1$, and then increases. When the model of FIG. 7B is applied, the distance from the node $n_2$ to the object $O_1$ is 3, and the distance to the object $O_1$ linearly increases as a virtual reference location becomes farther from the node $n_2$. When the model of FIG. 7C is applied, the distance from the node $n_3$ to the object $O_1$ is 1, and the distance to the object $O_1$ linearly decreases as a virtual reference location becomes closer to node $n_3$.

When the road network of FIG. 8A is all a two-way directional network, a minimum distance at each location is actually the distance from each location to an object $O_1$. Accordingly, the distance models ranging from FIG. 8B and FIG. 8C may be acquired.

In this case, in FIG. 8C, both a location at which the distance object $O_1$ is longer than the query distance "4" and a location at which the distance object $O_1$ is shorter than the query distance "4" are present, and thus the object $O_1$ is an object that influences the determination of a safe region in the road segment of FIG. 8A. When the influence of the object $O_1$ is taken into account, the point $P_1$ and node $n_5$ of FIG. 8C correspond to safe exits, i.e., the boundary points of a safe region.

Figure 9A:
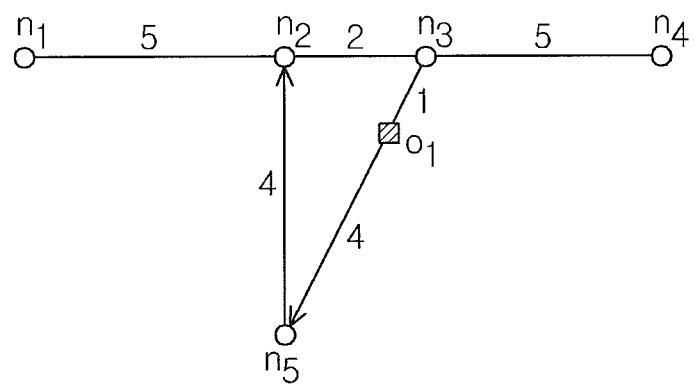
FIGS. 9A, 9B, and 9C are diagrams showing the number of various cases of computing the distance to an object based on the movement of a virtual reference location along a path among three intersections, including a road segment having directionality, according to another embodiment of the present invention.
Figure 9B:
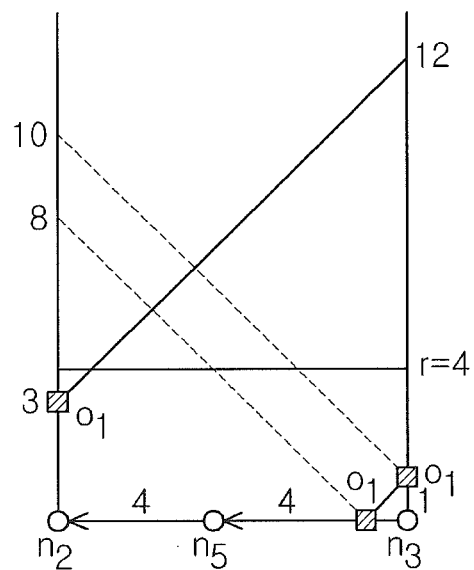
Figure 9C:
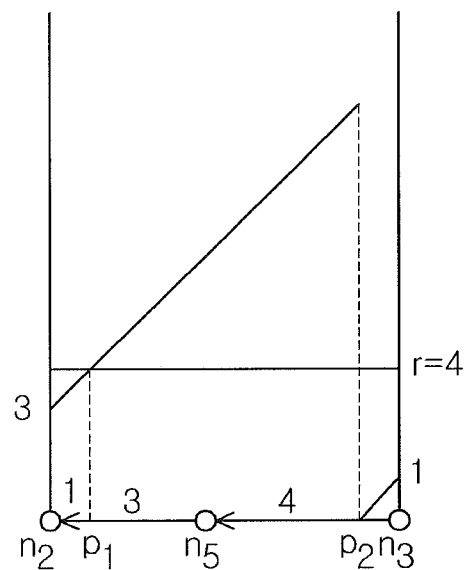

FIGS. 9A, 9B, and 9C are diagrams showing the number of various cases of computing the distance to an object based on the movement of a virtual reference location along a path among three intersections, including a road segment having directionality, according to another embodiment of the present invention.

FIG. 9A shows a road network having the same arrangement as the road network of FIG. 8A, except for directionality. However, from FIG. 9A, it can be seen that a road segment from a node $n_3$ to node $n_5$ and a road segment from the node $n_5$ from a node $n_2$ are one-way road segments.

FIG. 9B shows an example in which the distance models of FIG. 7A through FIG. 7C have been applied to the road network of FIG. 9A, like FIG. 8B. In this case, in FIG. 9B, some distance models are not valid due to the one-way directionality of the road network.

The distance model of FIG. 7C is not valid for the overall interval of FIG. 9B, and the distance model of FIG. 7A is valid only for the interval from an object $O_1$ to a node $n_3$. The reason for this is that, when a virtual reference location is located in the interval from the object $O_1$ to a node $n_5$, a path in a direction from the virtual reference location to the object $O_1$ cannot be selected.

Meanwhile, the distance model of FIG. 7B may be validly applied to the overall interval of FIG. 9B. Accordingly, when a minimum distance is selected at each location in connection with the valid distance models of FIG. 9B, FIG. 9C is obtained.

In FIG. 9C, the points at which the distance to the object $O_1$ is equal to the query distance r=4 are $P_1$ and $P_2$. In this case, $P_2$ is identical to the location of the object $O_1$. That is, the points $P_1$ and $P_2$ are safe exits on the road network of FIG. 9A. Furthermore, it can be seen that the object $O_1$ is an object that influences the safe region of the road network.

Figure 10A:
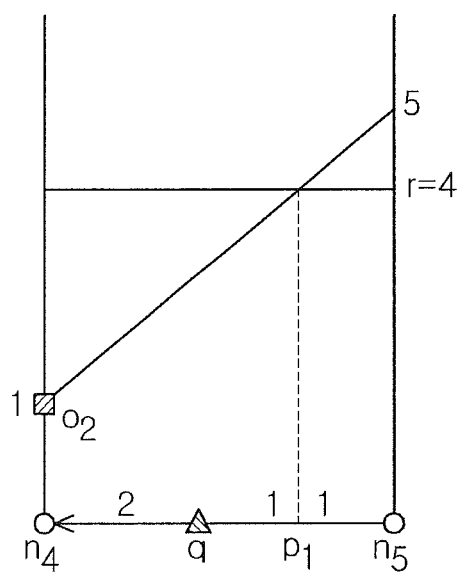
FIGS. 10A and 10B are diagrams illustrating a method of determining the location of a safe exit between two intersections in a road segment having directionality according to an embodiment of the present invention.
Figure 10B:
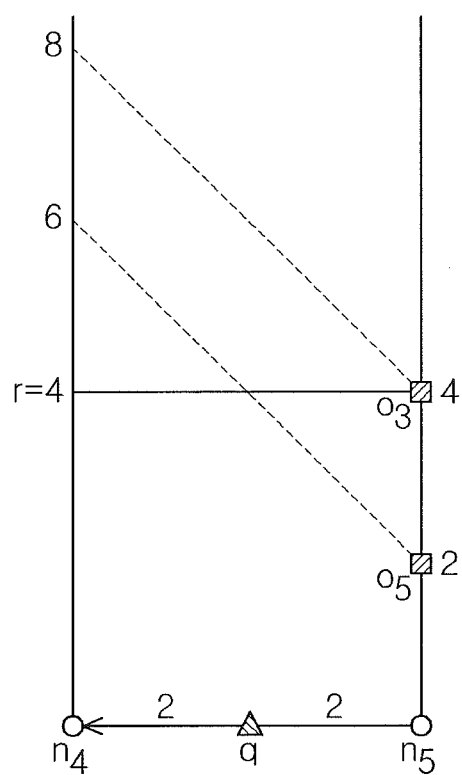

FIGS. 10A and 10B are diagrams illustrating a method of determining the location of a safe exit between two intersections in a road segment having direction information according to an embodiment of the present invention.

FIG. 10A shows a process of determining whether an object $O_2$, i.e., the computational result of a range query within the query distance r=4 at a node $n_4$, corresponds to the computational result of a range query at a query location q.

The object $O_2$ is located beyond the node $n_4$. Accordingly, the distance model of FIG. 7B may be applied to FIG. 10A. Since the distance model of FIG. 7B is suitable for the directionality of the road network of FIG. 2, it can be validly applied. Accordingly, it can be determined that the object $O_2$ is validly the computational result of the range query at the query location q. The location $P_1$ that provides an intersection between the distance model of FIG. 10A and the query distance r=4 is a candidate exit of a safe region.

Meanwhile, FIG. 10B shows a distance model that analyzes the distances to objects $O_3$ and $O_5$, i.e., the computational results of a range query within the query distance r=4 from the node $n_5$. Since the object $O_3$ and $O_5$ are located beyond the node $n_5$, the distance model of FIG. 7C is applied to this case. However, the distance model of FIG. 7C cannot be validly applied after the node $n_5$ due to the directionality of the road network between $n_4$ to $n_6$.

Accordingly, the object O3 and the object O5 are not included in the computational results of a range query at the query location q, and the node $n_s$ is presented as a safe exit candidate in FIG. 10B.

When FIG. 10A and FIG. 10B are combined with each other, a safe exit candidate closest to the query location q is a location $P_1$. Accordingly, the point $P_1$ is selected as a safe exit for a range query result corresponding to the query distance r=4 based on the query location q.

Although only the object $O_2$ has been analyzed in FIG. 10A because the result of the range query at the query location q is only the object $O_2$ in FIGS. 1, 2, 10A and 10B, it will be necessary to analyze the distances to all objects included in a range query result when the result of the range query based on the query location includes a plurality of objects.

FIG. 11 is a block diagram showing an apparatus for computing a range query result, which is included in a server, according to an embodiment of the present invention.

The apparatus 1100 for computing a range query result includes a processor 1100a and intersection range query result storage unit 1160. The processor 1100a may include: a reception unit 1110 configured to receive a request for a range query for an object located within a query distance from a query location from a client terminal; a range query result computation unit 1120 configured to compute a first range query result based on the query location in response to the range query request from the client terminal; a safe region computation unit 1130 configured to compute a safe region that provides a range query result identical to the first range query result based on the query location; and a transmission unit 1140 configured to transmit the range query result based on the query location and information about the safe region to the client terminal.

In this case, range query result computation unit 1120 may calculate the distance from the query location to each object by taking account of the directionality of a road segment located within the query distance from the query location, and then may compute the range query result.

Furthermore, the safe region computation unit 1130 may extract the location of a safe exit, i.e., a boundary point of the safe region, on a road as core information representative of the boundary of the safe region. The transmission unit 1140 may transmit information about the extracted location of the safe exit on the road to the client terminal.

Furthermore, the processor 1100a within the apparatus 1100 for computing a range query result may include: an intersection range query result computation unit 1150 configured to compute a range query result for each intersection while the reception unit 1110 receives an N-th query request from the client terminal and the range query result computation unit 1120 computes a range query based on the query location of the client terminal. The apparatus 1100 may further include an intersection range query result storage unit 1160 configured to store the range query result for the intersection computed by the intersection range query computation unit 1150 under the control of the processor 1100a. In this case, the safe region computation unit 1130 may extract information about the safe region using the range query result for the intersection stored in the intersection range query result storage unit 1160. Furthermore, the range query result computation unit 1130 may also compute a range query result based on the query location using the range query result for the intersection stored in the intersection range query result storage unit 1160.

Figure 12:
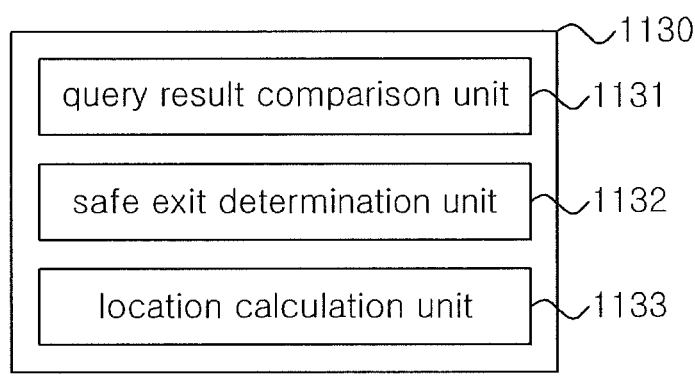
FIG. 12 is a block diagram showing the conceptual configuration of one component of FIG. 11.

FIG. 12 is a block diagram showing the conceptual configuration of one component of FIG. 11.

The safe region computation unit 1130 shown in FIG. 11 may include: a query result comparison unit 1131 configured to compare range query results based on each intersection adjacent to a query location and a range query result based on the query location; a safe exit determination unit 1132 configured to determine whether a safe exit, i.e., a boundary point of a safe region, is present between each intersection adjacent to the query location and the query location using the result of the comparison obtained by the query result comparison unit 1131; and a location calculation unit 1133 configured to calculate the location of the safe exit on a road by taking account of changes in the distances to adjacent objects based on the virtual movement of the reference location of a range query on the road on which the safe exit has been determined to be present.

In this case safe, if it is determined that a safe exit is not present between a first intersection adjacent to the query location and the query location, the exit determination unit 1132 extends a search range to a second intersection adjacent to the first intersection, computes a range query result at the second intersection, and compares this range query result with the range query result at the query location. In this case, if it is determined that a safe exit is not present in connection with the second intersection, the exit determination unit 1132 may extend the search range to a third intersection adjacent to the second intersection.

Meanwhile, if the range query result at the second intersection is different from the range query result at the query location, the safe exit determination unit 1132 may determine whether a safe exit is present between the second intersection and the first intersection, and the location calculation unit 1133 may calculate the location of the safe exit.

Figure 13:
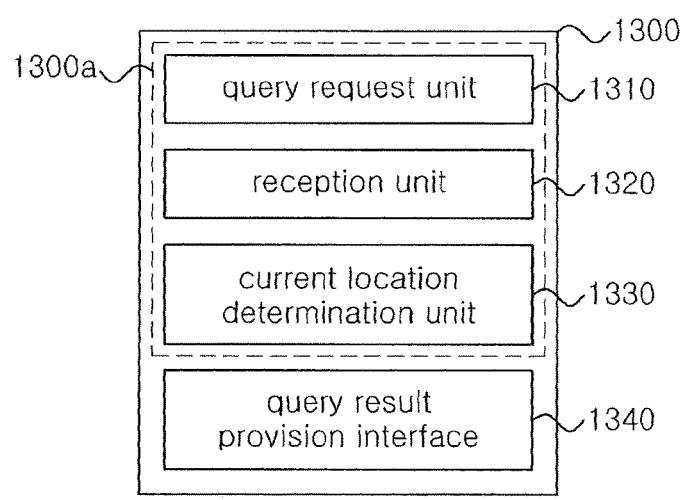
FIG. 13 is a block diagram showing an apparatus for providing a range query result, which is included in a client terminal, according to another embodiment of the present invention.

FIG. 13 is a block diagram showing an apparatus for providing a range query result, which is included in a client terminal, according to another embodiment of the present invention.

The apparatus 1300 for providing a range query result includes a processor 1300a, and the processor 1300a may include: a query request unit 1310 configured to request a range query for an object located within a query distance from a first location to a server; a reception unit 1320 configured to receive a first range query result based on the first location and information about a safe region that provides a result identical to the first range query result based on the first location; and a current location determination unit 1330 configured to determine the current location of a moving client terminal. The apparatus 1300 may further include a query result provision interface 1340 configured to provide the first range query result based on the first location to a user as a range query result for the current location of the client terminal if the current location of the moving client terminal is included in the safe region under the control of the processor 1300a.

In this case, the query request unit 1310 requests a range query for the second location of the client terminal to a server if the current location of the client terminal is included in the safe region or the current location of the client terminal is expected to depart from the safe region soon.

In this case, the range query is a range query that takes into account the directionality of a road segment located within the query distance from the first location. The query result provision interface 1340 provides the previous range query result for the first location as a range query result for a current location if the current location is included in the safe region based on the previously received range query result for the first location. Through this process, the load of communication between the client terminal and the server and the computational load of the server are reduced.

As described above, a number assigned to a graph between nodes in FIGS. 1 and 2 may be representative of the arrival time between two nodes to which a weight has been assigned by taking into account the distance between two nodes or the traffic conditions of a road. In this case, the arrival time between nodes may vary depending on the traffic conditions of a road. Accordingly, there is proposed a reduced safety zone technique that is designed such the range query result and safe region information of the present invention are valid regardless of changes in the value, assigned to each graph of a road network, attributable to traffic congestion. The reduced safe region technique is described in conjunction with FIGS. 14 to 18.

As described in conjunction with FIGS. 1 to 13, information found in a surrounding network including a network to a query location q belongs is defined as a first safe region SR_ex. As described in conjunction with FIGS. 14 to 18, information found in a network to a query location q belongs is defined as a second safe region SR_re. The second safe region is a reduced safe region compared to the first safe region. The second safe region may be identical to the first safe region, or may be included in the first safe region. Generally, the costs required to compute the second safe region will be equal to or lower than the costs required to compute the first safe region. The reason for this is that only the network to which a query location q belongs is taken into account when the second safe region is computed.

Figure 14:
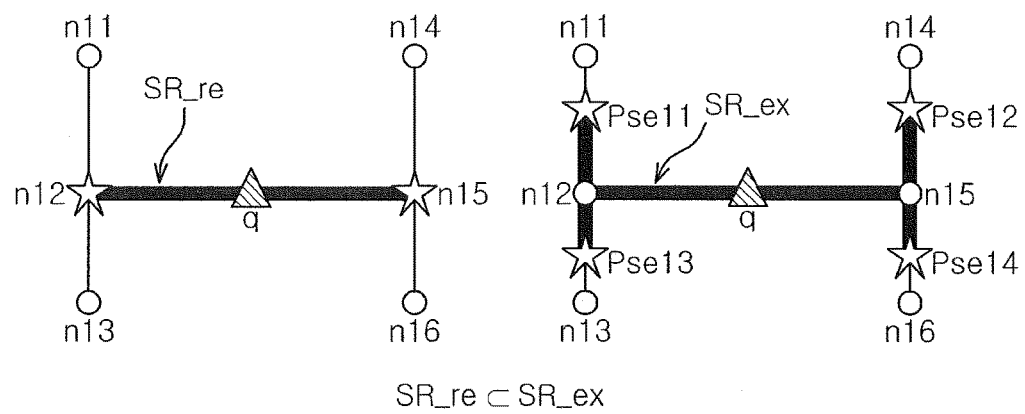
FIGS. 14 and 15 show examples in which both a first safe region and a second safe region are shown on the same network.

FIG. 14 shows an example in which both a first safe region and a second safe region are shown on the same network. Referring to FIG. 14, a query location q is located between a node n12 and a node n15, and thus the second safe region SR_re is computed only between the node n12 and the node n15. In contrast, the first safe region SR_ex is computed not only between the node n12 and the node n15 but also for an adjacent network.

Figure 15:
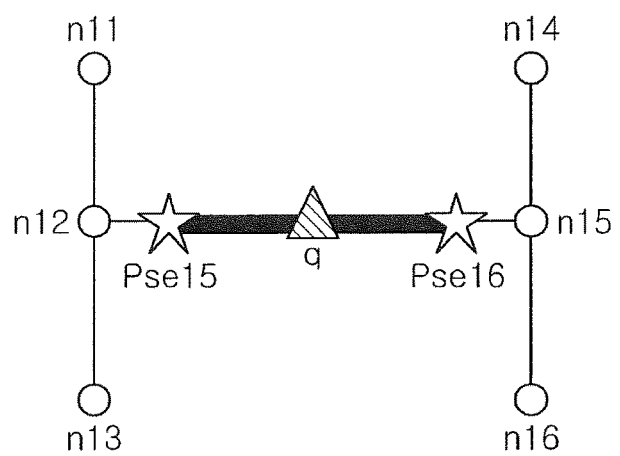

FIG. 15 shows another example in which both a first safe region and a second safe region are shown on the same network. Referring to FIG. 15, the first safe region is present only within a network $\overline{n12n15}$ to which a query location q belongs, and thus the first safe region and the second safe region provide the same result by chance. In the following description, the network to which the query location q belongs is defined as an active sequence for ease of description. In FIGS. 14 and 15, $\overline{n12n15}$ corresponds to the active sequence.

When the traffic conditions of a road network change in real time, periodically or on an event basis, it is very wasteful to re-compute a safe region taking into account all changes in traffic conditions. Accordingly, it is necessary to set a condition that is used to determine whether a given change in traffic conditions influences the existing computational result of a safe range query.

In an embodiment of the present invention, a critical region for a safe region is defined in order to determine whether a change in traffic conditions influences an existing safe region whether the traffic conditions of a road network change.

A critical region is composed of a set of points p that satisfy Equation 2 below:

$$p \in CR, \text{MIN } (d\ (p_\alpha, p), d(p_\beta, p)) 23\ r \quad (2)$$

where CR is a critical region, r is a query distance, and $p_\alpha$ and $p_\beta$ are safe exits of a safe region. Equation 2 is defined on the assumption that the number of exits of a safe region is 2. When the number of the exits of a safe region is 3 or more, all the points p at which the minimum value of the distances to respective safe exits falls within the query distance r will be included in the critical region.

Figure 16:
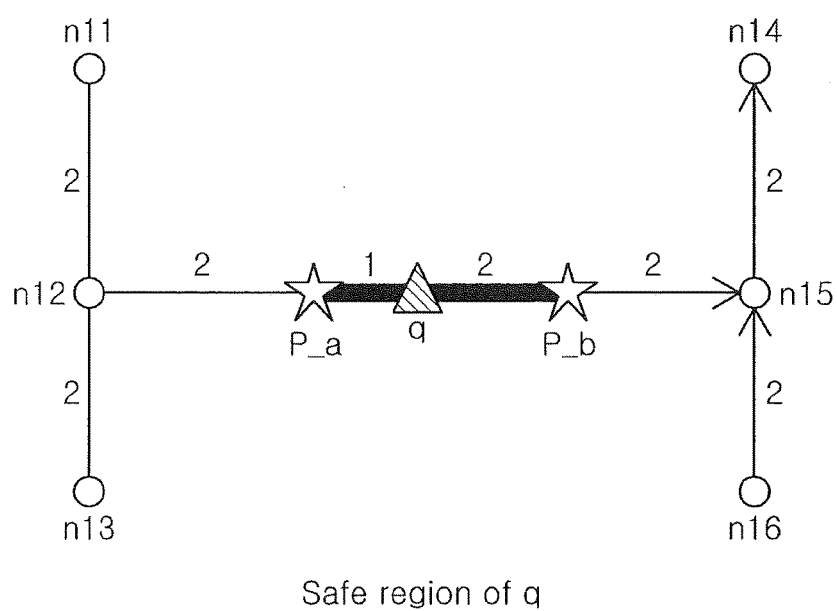
FIG. 16 is a diagram showing an example of a second safe region.
Figure 17:
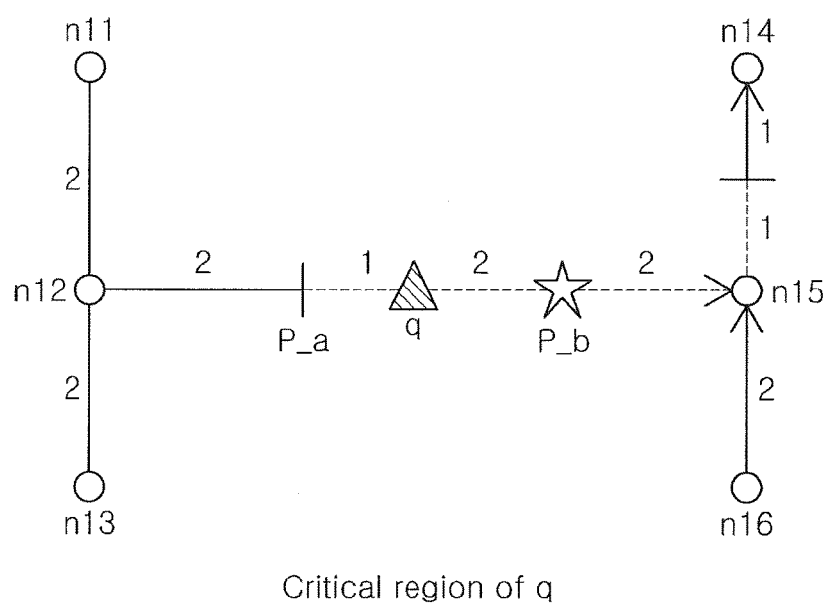
FIG. 17 is a diagram showing an example of a critical region in a network identical to that of FIG. 16.

To help the understanding of the critical region, FIGS. 16 and 17 are provided.

FIG. 16 is a diagram showing an example of a second safe region, and FIG. 17 is a diagram showing an example of a critical region in a network identical to that of FIG. 16.

Referring to FIG. 16, a network between a node n12 and a node n15 is a one-way road having the one-way direction information from the node n12 to the node n15. When the condition for a query distance from a query location q is r=3, a safe region is a road segment between P_a and P_b.

Referring to FIG. 17, a critical region, i.e., a set of points located within the query distance r=3 from the safe exit P_a or P_b, is indicated by dotted lines. In this case, the critical region is computed by taking account of the one-way direction information of a network between the node n12 and the node n15 and the one-way direction information of a network between a node n16 and the node n15.

In order to determine a need for the re-computation of a safe region attributable to a change in the weight of a road network (a change resulting from a change in traffic conditions), information about a second safe region and a critical region for each query location q are put into a database and stored. In this case, referring to FIG. 11 again, when the weight of a road network (the distance or arrival time related to the network) has been changed, the safe region computation unit 1130 determines whether the network whose weight has been changed belongs to a critical region for a query location q. If the network whose weight has been changed does not belong to the critical region for the query location q, the previous safe region information is maintained without change, and thus additional action is not required. In contrast, if the network whose weight has been changed belongs to the critical region for the query location q, the previous safe region information needs to be updated, and thus the safe region computation unit 1130 re-computes a safe region. When the safe region is re-computed, a critical region is also re-computed, updated, and stored in a database.

In the case where the single server 1100 processes a plurality of range query results based on a plurality of query locations, the safe region computation unit 1130 may identify critical regions to which a network whose weight has been changed belongs by rapidly searching a critical region information database, and may re-compute safe region information for queries corresponding to the respective identified critical regions. For a query for which safe region information has been re-computed, a critical region is also re-computed, updated, and stored in a database.

Figure 18:
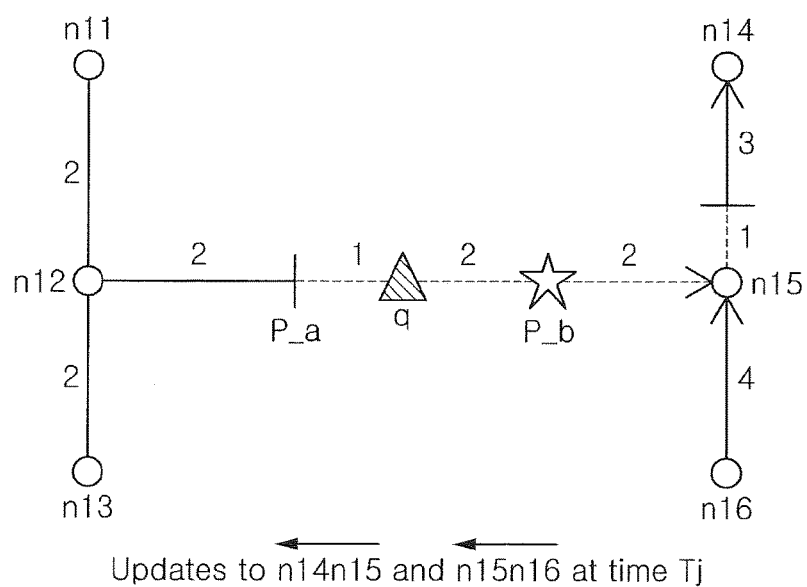
FIG. 18 shows an example of a process of determining a need for the re-computation of a critical region attributable to a change in the weight of a network.

FIG. 18 shows an example of a process of determining a need for the re-computation of a critical region attributable to a change in the weight of a network. Referring to FIGS. 17 and 18 together, FIG. 17 shows the weight of a network and a critical region at time Ti, and FIG. 18 shows the weight of a network and a critical region at time Tj. In this case, Ti<Tj. In FIG. 17, at time Ti, the arrival distance (or the arrival time) for networks $\overleftarrow{n14n15}$ and $\overleftarrow{n15n16}$ is 2, and one of the end points of a critical region is located on the network $\overleftarrow{n14n15}$. In FIG. 18, at time Tj, the arrival distance (or the arrival time) for networks $\overleftarrow{n14n15}$ and $\overleftarrow{n15n16}$ is changed to 4. In this case, since a critical region is not present on the network $\overleftarrow{n15n16}$, a change in the arrival distance (or the arrival time) for the network $\overleftarrow{n15n16}$ does not influence a critical region or safe region. However, since a critical region is present on the network $\overleftarrow{n14n15}$, the safe region computation unit 1130 re-computes a safe region and also updates a critical region when the arrival distance (or arrival time) for the network $\overleftarrow{n14n15}$ has been changed. Although the safe region has not been changed regardless of the re-computational result of the safe region in the embodiment shown in FIG. 18, it will be apparent to those skilled in the art from the descriptions of FIGS. 17 and 18 that the value of a safe region may be changed depending on some other embodiments.

The method of computing a range query result and the method of providing a range query result according to the embodiments of the present invention may be implemented in the form of program instructions and may be recorded in a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

The present invention can reduce the costs required for the installation of an additional server for the purpose of dealing with a peak-time load because the load of a server does not considerably increase even in the case of an increase in the number of client terminals due to the use of a distributed algorithm. That is, according to the present invention, a client processes part of the computation task of the server, and thus an advantage arises in that the load of the server is distributed.

Furthermore, a k-nearest query is requested to a server only when a client terminal has departed from a safe region, and thus an advantage arises in that the costs required for communication between the client terminal and the server are reduced. Furthermore, the number of communications and the amount of data of the communication between the client terminal and the server are reduced, and thus the load of a network can be reduced and also influence on the communication of other users can be minimized.

Furthermore, according to the present invention, information about a safe region for a range query for a road network having direction information can be effectively computed. Furthermore, a range query result based on a path distance, in which the characteristics of a road network have been taken into account, other than an Euclidean distance (a rectilinear distance), can be provided, and the corresponding road network may be represented by a physical distance or may be represented by a temporal distance (a distance proportional to the arrival time).

Furthermore, according to the present invention, in order to reduce the computational load of a server, there is provided a shared execution technique for sharing a range query result at an intersection node, which can be shared by each range query. According to this technique, once a range query result has been computed at a specific intersection node, this range query results can be shared by a subsequent range query, and thus the computational load of the server required for the computation of each range query can be significantly reduced. In the present invention, to computer a range query result and the location of a safe exit, a range query result at each intersection node is computed and then used. Accordingly, when the range query result at the intersection node, which has been computed in connection with the previous range query, is used for a subsequent range query, the computational load of a server can be reduced.

The present invention has been derived from research carried out as part of the General Researcher Support Project that has been sponsored by the Korean Ministry of Education, Science and Technology and the National Research Foundation of Korea [Project Management Number: 2012R1A1A2043422; Project Name: Research into Top-k Query Processing Algorithm in Location-based Service with Location Security and Location Uncertainty Taken into Account].

As described above, although the present invention has been described in conjunction with specific details, such as specific elements and limited embodiments and drawings, these are provided merely to help the overall understanding of the present invention. The present invention is not limited to these embodiments, and various modifications and variations can be made based on the foregoing description by those having ordinary knowledge in the art to which the present invention pertains.

Accordingly, the technical spirit of the present invention should not be defined based on only the described embodiments, and the following claims, all equivalents to the claims and equivalent modifications should be construed as falling within the scope of the spirit of the present invention.

What is claimed is:

1. A method of computing a range query result, comprising:
receiving, at a processor, a request for a range query for an object located within a query distance from a query location, from a client terminal;
computing, by the processor, a first range query result based on the query location in response to the request for the range query, wherein the first range query result depends on direction information associated to a road segment located within the query distance from the query location;
computing, by the processor, a safe region that provides a range query result identical to the first range query result based on the query location; and
transmitting, by the processor, the first range query result based on the query location and information about the safe region to the client terminal,
wherein:
the computing the safe region comprises extracting, by the processor, locations of safe exits, which are boundary points of the safe region, on a road; and
the transmitting the first range query result and the information about the safe region to the client terminal comprises transmitting information about the extracted locations of the safe exits on the road to the client terminal,
wherein the computing the safe region comprises:
computing, by the processor, a second range query result based on at least one intersection adjacent to the query location;
comparing, by the processor, the second range query result based on the at least one intersection adjacent to the query location and the first range query result based on the query location; and
determining, by the processor, whether a safe exit, which is a boundary point of the safe region, is present between the at least one intersection adjacent to the query location and the query location using a result of the comparison.

2. The method of claim 1, wherein the computing the safe region further comprises calculating, by the processor, a location of the safe exit on the road by simulating changes in distances to neighboring objects caused by virtual movement of the reference location of the range query on the road on which the safe exit has been determined to be present.

3. The method of claim 1, wherein the computing the safe region further comprises:
if the safe exit is not present between a first intersection of the at least one intersection adjacent to the query location and the query location, computing, by the processor, a third range query result based on at least one second intersection adjacent to the first intersection; and
comparing, by the processor, the third range query result based on the second intersection and the first range query result based on the query location.

4. The method of claim 1, wherein the direction information associated to the road segment corresponding to the range query is two-way directionality or one-way directionality.

5. The method of claim 1, further comprising:
computing, by the processor, a range query result for at least one intersection; and
storing, by the processor, the range query result for the at least one intersection;
wherein computing the safe region comprises extracting, by the processor, information about the safe region using the stored range query result about the at least one intersection.

6. A method of providing a range query result, comprising:
requesting, by a processor, a range query for an object located within a query distance from a first location, to a server;
receiving, at the processor, a first range query result based on the first location and information about a safe region that provides a result identical to the first range query result based on the first location, wherein the first range query result depends on direction information associated to a road segment located within the query distance from the first location;
determining, by the processor, a current location of a moving client terminal;
providing, by the processor, the first range query result to a user as a range query result for the current location if the current location of the moving client terminal is included in the safe region;
extracting, by the processor, locations of safe exits, which are boundary points of the safe region, on a road;
transmitting, by the processor, information about the extracted locations of the safe exits on the road to the client terminal;
monitoring, by the processor, a change in a value assigned to at least one road segment;
determining, by the processor, whether the change in the value assigned to the at least one road segment influences a previous computational result of the safe region; and
recalculating, by the processor, the safe region using the changed value assigned to the at least one road segment if the change in the value assigned to the at least one road segment influences the previous computational result of the safe region.

7. The method of claim 6, further comprising, requesting, by the processor, a second range query for a second location to the server if the current location is not included in the safe region or the current location is expected to depart from the safe region.

8. The method of claim 6, further comprising calculating, by the processor, a critical region which is a set of points located within the query distance from at least one of safe exits, which are boundary points of the safe region;
wherein determining whether the change in the value influences the previous computational result of the safe region comprises determining whether the road segment whose assigned value has been changed belongs to the critical region; and
wherein recalculating the safe region comprises recalculating and updating the critical region based on the recalculated safe region.

9. An apparatus for computing a range query result, comprising a processor configured to:
receive a request for a range query for an object, located within a query distance from a query location, from a client terminal;
compute a first distance from the query location to the object by taking account of direction information associated to road element located within the query distance from the query location;
compute a first range query result based on the query location in response to the request for a range query, wherein the first range query result depends on the first distance and the direction information;

compute a safe region that provides a range query result identical to the first range query result based on the query location;

transmit the first range query result based on the query location and information about the safe region to the client terminal;

extract locations of safe exits, which are boundary points of the safe region, on a road;

transmit information about the extracted locations of the safe exits on the road to the client terminal;

compute a second range query result based on at least one intersection adjacent to the query location;

compare the second range query result based on the at least one intersection adjacent to the query location and the first range query result based on the query location; and determine whether a safe exit, which is a boundary point of the safe region, is present between the at least one intersection adjacent to the query location and the query location using a result of the comparison.

10. The apparatus of claim 9, the processor is further configured to calculate a location of the safe exit on the road by simulating changes in distances to neighboring objects caused by virtual movement of the reference location of the range query on the road on which the safe exit has been determined to be present.

11. The apparatus of claim 9, the processor is further configured to:

compute a range query result for at least one intersection;

store the range query result for the at least one intersection in a non-transitory memory or a storage device; and extract information about the safe region using the stored range query result about the at least one intersection.

12. An apparatus for providing a range query result, comprising a processor configured to:

request a range query for an object located within a query distance from a first location, to a server;

receive a first range query result based on the first location and information about a safe region that provides a result identical to the first range query result based on the first location, wherein the first range query result depends on direction information associated to a road segment located within the query distance from the first location;

determine a current location of a moving client terminal;

provide the first range query result based on the first location to a user as a range query result for the current location, if the current location of the moving client terminal is included in the safe region;

extract locations of safe exits, which are boundary points of the safe region, on a road;

transmit information about the extracted locations of the safe exits on the road to the client terminal;

monitor a change in a value assigned to at least one road segment;

determine whether the change in the value assigned to the at least one road segment influences a previous computational result of the safe region; and recalculate the safe region using the changed value assigned to the at least one road segment if the change in the value assigned to the at least one road segment influences the previous computational result of the safe region.

13. The apparatus of claim 12, wherein the processor is further configured to request a second range query for a second location to the server if the current location is not included in the safe region or the current location is expected to depart from the safe region.

* * * * *